US006366828B1

(12) United States Patent
De Leo et al.

(10) Patent No.: US 6,366,828 B1
(45) Date of Patent: Apr. 2, 2002

(54) METHOD FOR COLLECTING AND TRANSPORTING GROUPS OF PARTLY SUPERIMPOSED POSTAL OBJECTS

(75) Inventors: Guido De Leo; Stefano Solari, both of Genoa (IT)

(73) Assignee: Elsag SpA, Genoa (IT)

( * ) Notice: Subject to any disclaimer, the term of this patent is extended or adjusted under 35 U.S.C. 154(b) by 0 days.

(21) Appl. No.: 09/213,039

(22) Filed: Dec. 16, 1998

(30) Foreign Application Priority Data

Dec. 17, 1997 (IT) ....................................... TO97A1106

(51) Int. Cl.[7] ................................................ G06F 7/00
(52) U.S. Cl. .................................. 700/228; 198/370.01
(58) Field of Search ................................ 700/230, 228, 700/213; 209/584, 900, 583; 198/370.01

(56) References Cited

U.S. PATENT DOCUMENTS 2,918,164 A * 12/1959 Austin et al. .......... 198/370.01
4,171,746 A * 10/1979 Talyzin et al. .............. 209/657
5,119,954 A * 6/1992 Svyatsky et al. ........... 209/584
5,143,225 A 9/1992 Rabindran et al.
5,346,072 A 9/1994 Dian et al.
5,908,116 A * 6/1999 Levaro et al. .............. 209/584

FOREIGN PATENT DOCUMENTS

EP 0654309 11/1993
EP 0804975 5/1997

* cited by examiner

*Primary Examiner*—Christopher P. Ellis
*Assistant Examiner*—Khoi H. Tran
(74) *Attorney, Agent, or Firm*—Patterson, Thuente, Skaar & Christensen

(57) ABSTRACT

A device for collecting and transporting groups of partly superimposed postal objects, aligned along a transport direction and having front edges spaced from each other. The device includes a plurality of first transport modules receiving as input groups of partly superimposed postal objects, and supplying these objects as output to a transport system, in particular, aloop transport system in communication with inlets of second transport modules. The transport system is coupled with a control unit to receive a group of partly superimposed postal objects output from any first source module, and supplying it to any second destination transport module.

5 Claims, 8 Drawing Sheets

METHOD FOR COLLECTING AND TRANSPORTING GROUPS OF PARTLY SUPERIMPOSED POSTAL OBJECTS

BACKGROUND OF THE INVENTION

The present invention concerns a device for collecting and transporting groups of partly superimposed postal objects.

Postal sorting systems are known comprising devices for automatically reading an input stream of flat and substantially rectangular postal objects (letters, cards, documents in envelopes, folded newspapers etc), which automatically read the address associated with that postal object. The automatic reading devices are also able to remove those postal objects for which it is not possible automatically to identify the address and send them to a collection device in which the postal objects are stored until the address can be manually identified. The known collection devices usually store the postal objects waiting for identification in containers in which the postal objects are deposited in succession. These devices are not very flexible in use, as they sometimes require manual operations to function (such as, for example, transport of and/or emptying the containers) and are therefore inefficient.

Stream forming devices also exist that receive postal objects as input, for example, in the form of packages, and generate as output a group of partially superimposed postal objects (FIG. 2), that is, aligned in a rectilinear direction, partly superimposed and arranged with their front edges (corresponding to the smaller side of the perimeter of the rectangle) suitably spaced from each other, for example, by a substantially constant spacing S.

SUMMARY OF THE INVENTION

The object of the present invention is to produce a collection device that performs the function of accumulating and transporting groups of partly superimposed postal objects in a completely automatic manner.

The aforesaid object is achieved by the present invention in that it concerns a collection and transport device for groups of partly superimposed postal objects of the type defined in claim 1.

BRIEF DESCRIPTION OF THE DRAWINGS

The invention will now be described with particular reference to the accompanying drawings that represent a preferred, non-limitative embodiment, in which.

DETAILED DESCRIPTION OF THE INVENTION

Figure 1:
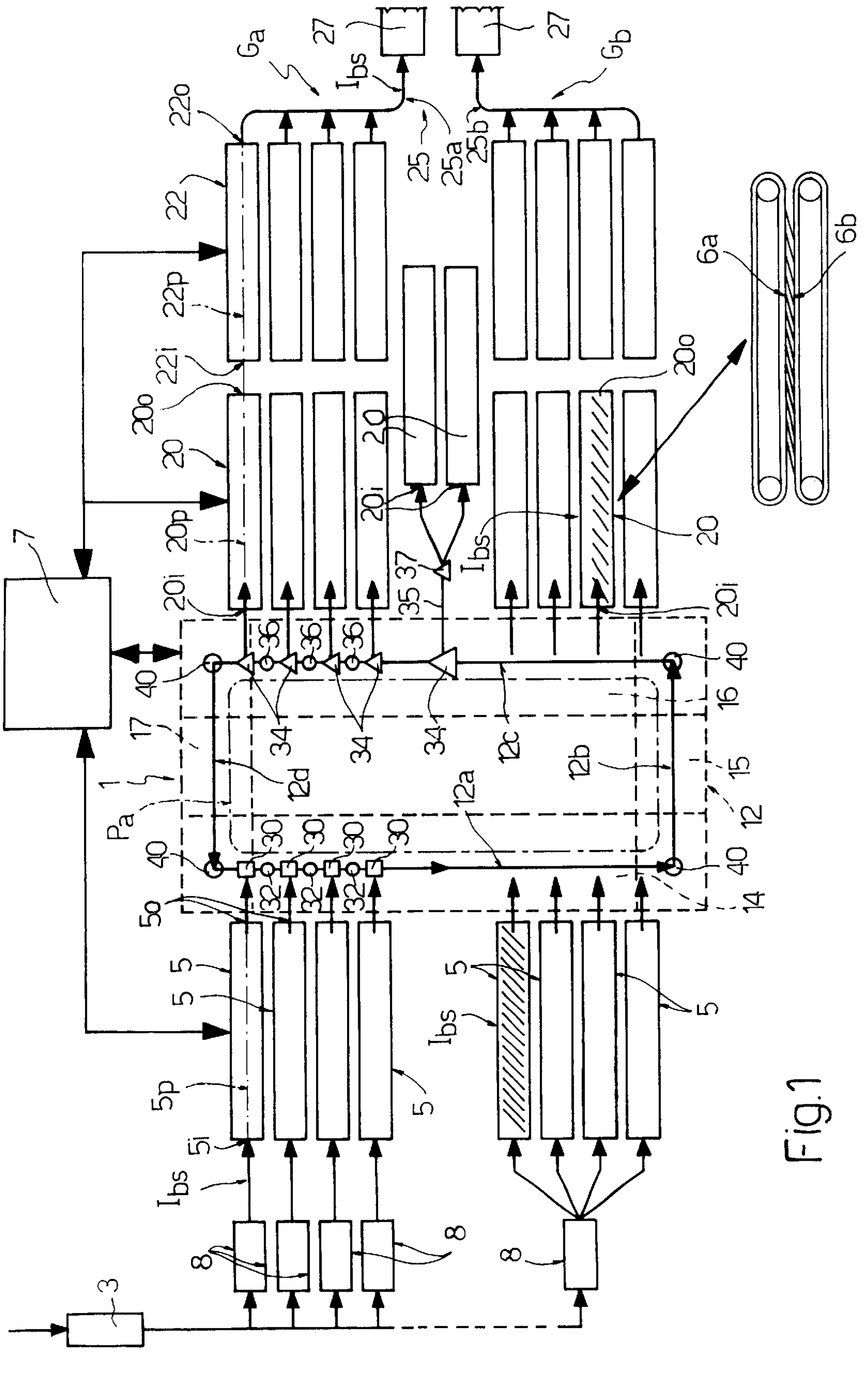
FIG. 1 schematically illustrates a collection and transport device realised according to the present invention.
Figure 2:
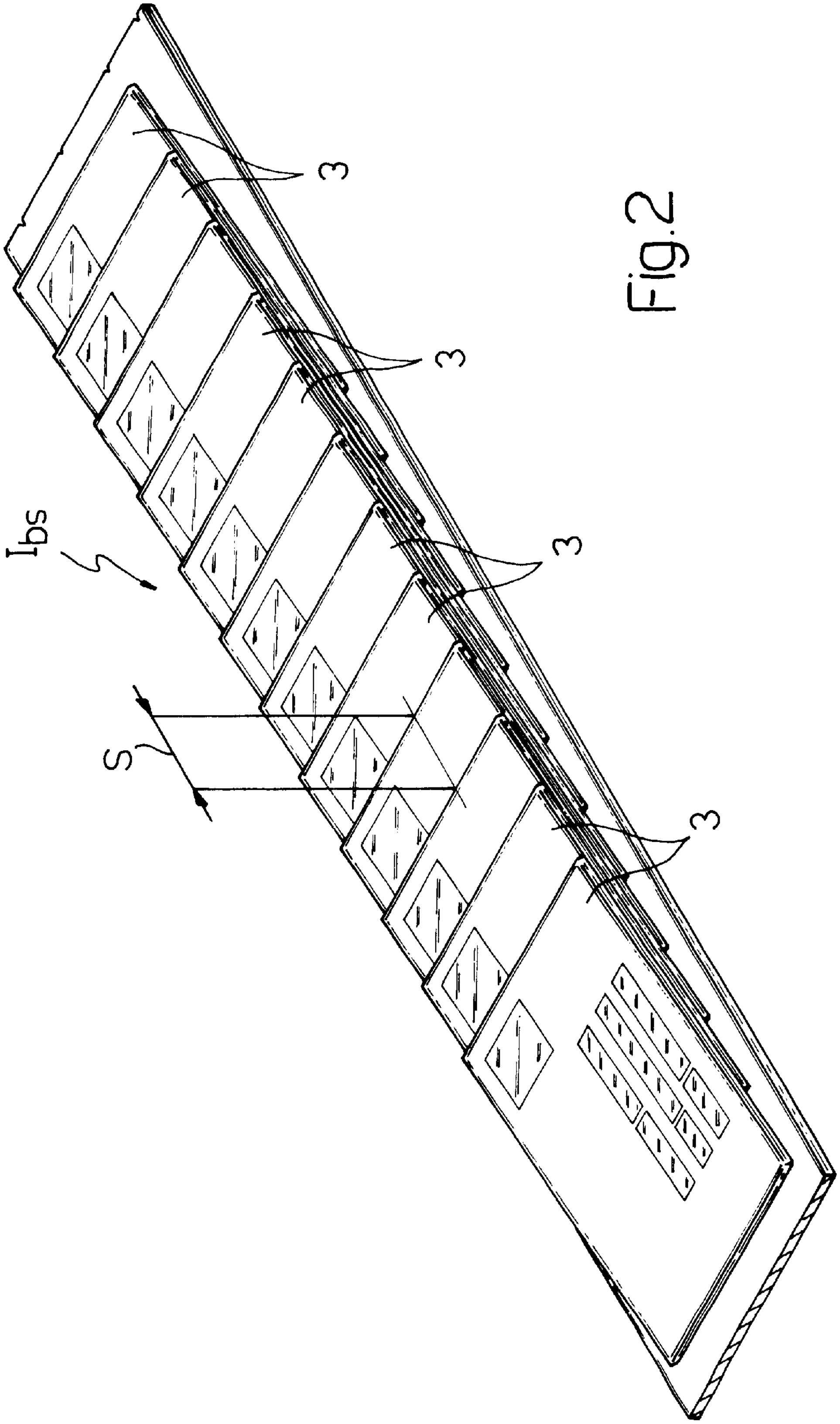
FIG. 2 illustrates on an enlarged scale a group of partly superimposed postal objects.

With particular reference to FIG. 1, the reference numeral 1 generally indicates a collection and transport device for groups of partly superimposed postal objects. The term "group of partly superimposed postal objects", Ibs, (FIG. 2) means a group of substantially rectangular postal objects 3 (letters, cards, flat objects in envelopes, etc) aligned in a rectilinear direction, partly superimposed and arranged with their front edges (corresponding to the smaller side of the perimeter of the rectangle) spaced from one another; this spacing can be a substantially constant spacing S, or can be a variable spacing in order to obtain a substantially constant height for the group of partly superimposed objects Ibs.

The device 1 includes a plurality of transport modules 5 (represented schematically) carried on a vertical support structure (not shown) and controlled by an electronic processing unit 7 (represented schematically). Each transport module 5 has a transport path **5*p* that extends between an inlet 5*i* and an outlet 5*o* of the module and receives as input a group of substantially superimposed postal objects Ibs; this group Ibs can be held stationary along the transport path 5*p* and/or it can be moved towards the outlet 5*o* at a substantially constant speed by means of known conveyor means that are illustrated schematically. The conveyor means provide for the linear transport of the group Ibs in such a way that relative position of adjacent partly superimposed objects does not change during transport. For example, these conveyor means can include two belts 6*a*, 6*b*** extending between pairs of driven pulleys, having facing rectilinear portions that move at the same speed and in the same direction in order to move a group of partly superimposed postal objects Ibs interposed between the facing portions.

Advantageously, but not exclusively, each transport module 5 can be coupled with an associated stream forming device 8 (of known type) that receives as input a plurality of postal objects 3, and generates as output a group of partly superimposed postal objects Ibs. Alternatively, a single stream forming device 8 can supply several transport modules 5.

In the example illustrated in FIG. 1, all of the transport modules 5 can communicate with their outlet **5*o* by means of a loop transport system 12 (controlled by the electronic unit 7** and forming a linear transport means for the group Ibs) which includes:

- an intake zone 14 including a vertical transport portion **12*a* in communication with all of the outlets 5*o*, and which receives the group of partially superimposed postal objects Ibs output from any transport module 5**;
- a transport zone 15 including a horizontal transport portion **12*b* that receives the postal objects from the transport portion 12**;
- an output zone 16 including a vertical transport portion **12*c* that receives the postal objects from the transport portion 12*b* and that communicates with the inlets 20*i* of modules 20**; and
- a recycling zone 17 including a horizontal transport portion **12*d* that receives the postal objects from the transport portion 12*c* and provides them as the input to the transport portion 12*a***.

The transport portions **12*a*, 12*b*, 12*c* and 12*d*** form a closed loop type of transport path Pa in which the groups of partly superimposed postal objects Ibs circulate; the circulation of these groups of postal objects ends when the postal objects leave the transport path Pa.

The device 1 further includes a plurality of transport modules 20 (represented schematically) carried on a vertical support structure (not shown) and controlled by the electronic processing unit 7. Each transport module 20 has a transport path **20*p* that extends between an inlet 20*i* in communication with the portion 12*c* and an outlet 20*o* of the module, and which receives as input a group of substantially superimposed postal objects Ibs from the transport portion 12***c*; this group Ibs can be held stationary along the transport path 20*p* and/or can be moved towards the outlet 20*o* at a substantially constant speed by means of known conveyor means that are illustrated schematically (for example, of the belt type). The conveyor means can achieve the linear transport of the group Ibs, that is, transport in which the relative position of adjacent partly superimposed objects does not change substantially during transport apart from minimal relative slipping.

For example, these conveyor means can include two belts 6*a*, 6*b* extending between pairs of driven pulleys and having facing rectilinear portions that move at equal speeds and in the same direction in order to move a group of partly superimposed postal objects Ibs interposed between the facing portions. In particular, according to the present invention, the transport portion 12*c* of the outlet zone 16 can communicate with all of the inlets 20*i* of the transport modules 20 for receiving a group of partly superimposed postal objects Ibs into each module 20.

Each module 20 has its own outlet 20*o* in communication with the inlet 22*i* of a transport module 22 having a structure similar to that of the module 20, and comprising a transport path 22*p* that extends from the inlet 22*i* to the outlet 22*o*; in this way, the transport paths 20*p* and 22*p* are consecutive and adjacent. The outlet 22*o* of each module 22 can communicate with the inlet of a further module (not shown) that has a structure similar to that of the modules 20 and 22; in other words, the transport module 20 can be coupled with a plurality of adjacent similar modules, and the path 20*p* can be connected with a plurality of similar paths in order to create a complete path (not shown) along which the groups of partly superimposed postal objects Ibs move, moving from one module to the next. Similarly, each transport module 5 could be coupled with a plurality of similar adjacent modules, and the path 5*p* could be connected with a plurality of similar paths to create of a complete intake path (not shown) along which the groups of partly superimposed postal objects move, from the stream forming devices 8 to the transport system 12.

In the embodiment illustrated in FIG. 1, a single transport module 5 is illustrated, together with two contiguous transport modules 20, 22; the outlet 22*o* of each transport module 22 communicates with a discharge system 25 that removes the groups of partly superimposed postal objects Ibs from the device 1.

Advantageously, a first group Ga of transport modules 22 have outlets in communication with a first transport device 25*a*, and a second group Gb of transport modules 22 have outlets in communication with a second transport device 25*b*, separate from the device 25*a*; the transport devices 25*a*, 25*b* also have outlets in communication with further postal processing devices 27 (represented schematically) that receive the groups of partly superimposed postal objects Ibs.

In particular, a device 30 (represented with a square) is located at the intersection between an outlet 5*o* of a transport module 5 and the transport portion 12*a*, which, upon a command from the unit 7, enables the admission of a group Ibs into the transport portion 12, and which controls the initial and final moments of this admission. At least one sensor 32 is located between two consecutive devices 30 for controlling the group of postal objects Ibs moving along the transport portion 12*a*. Similarly, a device 34 (represented with a triangle) is located at the intersection between an inlet 20*i* of a transport module 20 and the transport portion 12c that, upon a command from the unit 7, enables the output of a group of objects Ibs from the transport portion 12 and its admission into a module 22; in particular, the device 34 controls the initial and final moments of this output.

At least one sensor 36 is located between two consecutive devices 34 for controlling the group of postal objects Ibs moving along the transport portion 12*c*.

Each transport portion 12*a*, 12*b*, 12*c* and 12*d* has a sensor 40 at its ends that detects the passage of a group of partly superimposed postal objects Ibs circulating in the transport system 12. The signals generated by the sensors 40 are sent to the electronic unit 7 which detects the time Tt at which the first object of the group Ibs (the head of the group of partly superimposed postal objects) passes, and the time Tc at which the last object at the rear of the group Ibs (the tail of the group of partly superimposed postal objects) passes. Knowing the times Tt and Tc, with the speed of movement of the transport system 12 also being known, enables the length of the group of partly superimposed postal objects to be known, as well as its position in the transport system 12.

The electronic unit 7 receives at least the following information from the transport modules 5;

- the state (free/occupied) of the module; free module=no group Ibs is on the path 5*p* occupied module=at least one group Ibs is on the path 5*p*; and
- an identification code for the group Ibs located on the path 5*p*.

Similarly, the electronic unit 7 receives at least the following information from the transport module 20, 22;

- the state (free/occupied) of the module 20, 22; free module=no Ibs group on the path 20*p*, 22*p* occupied module=at least one Ibs group on the path 20*p*, 22*p*; and
- an identification code for the group Ibs located on the path 20*p*, 22*p*.

The electronic unit 7 also has at least the following information in respect of each group of partly superimposed postal objects Ibs;

- a first identification code that uniquely identifies the group Ibs;
- a second identification code that uniquely identifies the destination transport module 20, 22 towards which the group Ibs must be sent;
- the length of the group of postal objects Ibs; and
- the position of the group of postal objects Ibs in the transport system 12.

The electronic unit 7 can also know the topology of the device 1, that is, the relative disposition of the transport modules 5, 20 and 22 and the system 12, and the rules for addressing the groups Ibs, that is, the rules according to which predetermined paths are defined through the system 12 for transporting the groups Ibs from source modules 5 to destination modules 20, 22.

In use, the groups of partly superimposed postal objects Ibs produced by the stream forming devices 8 are provided as input to the transport modules 5, and collected within the modules 5 themselves; in particular, within each module 5 at least one group of partly superimposed postal objects Ibs can gather on the path 5*p*. Obviously, all of the modules 5 can have groups of partly superimposed postal objects Ibs, or groups of partly superimposed postal objects Ibs can be supplied to a sub set of these modules 5. The electronic unit 7 can successively control the discharge of one (or more) modules into the transport system 12; to this end, the conveyor means (not shown) of a source module 5 are activated, and the group of postal objects Ibs is transferred in the transport portion 12*a* via an associated device 30. The group of postal objects Ibs therefore moves along the closed transport path Pa until it is intercepted by a device 34 that directs it towards a respective destination module 20 within which the group Ibs is located; the group of partly superimposed postal objects Ibs can then be transferred from the module 20 to the module 22. In this way, the accumulation within the modules 20, 22 is achieved.

The speed of transport along the path 20*p*, 22*p* can be different from, particularly, less than, the speed of transport along the path 5*p* in order to inspect and consolidate the group of objects Ibs within the transport module 20, 22, and thus collect more objects per unit length.

The group Ibs could be recirculated within the transport system 12 for a theoretically indeterminate time; in practice, the recirculation of a group Ibs, made possible by the loop structure of the transport system 12 is, for example, effected when the destination module 20 selected by the electronic unit 7 is occupied. The loop structure described above enables recirculation to take place, avoiding having to deposit a group Ibs until, for example, a destination module becomes available close to a collection zone (for example, a transport module used for the accumulation of the rejects) from which the group Ibs can then be removed. In the embodiment of FIG. 1, the groups Ibs entered into the transport system 12 use the transport portion 12*a*, the transport portion 12*b*, the transport portion 12*c* and, whenever the group Ibs has to travel along the path Pa for a distance greater than one circuit, the transport portion 12*b*.

The number of groups Ibs that can be located contemporaneously on the loop Pa depends in direct proportion on the capacity (the length) of the loop, the length of the groups Ibs and the distance there must be between consecutive groups Ibs.

The groups Ibs coming from the source modules 5 can be sent to the transport system 12 in a precise temporal sequence and thus arranged along the path Pa in a predetermined order; this order is maintained on transferring the group of objects Ibs circulating on the loop Pa to a destination module 20, 22 starting from the first group Ibs previously entered into the system 12. For example, if A, B, and C are three groups of postal objects Ibs coming from a single transport module 5, the groups can be entered into the transport system 12 in the following order: first, the group A, secondly, the group B and thirdly, the group C. The groups A, B and C therefore move along the loop Pa with the group A in front with respect to the direction of advance, and the group C at the rear with respect to this direction of advance. The electronic unit 7 can therefore activate a device 34 to send the sequence of groups of objects A, B and C towards a destination transport module 20, 22 within which the objects are arranged in the same sequence (A-B-C) as in the source transport module 5.

Alternatively, the groups Ibs coming from source modules 5 can be sent to the transport system 12 in a precise temporal sequence and then arranged on the path Pa in a predetermined order; this order is modified on transferring the group of objects Ibs circulating in the loop Pa in a destination module 20, 22, starting from a group other than the first group Ibs previously entered into the system 12. For example, if the said three groups of postal objects Ibs, A, B and C, start from the same source transport module 5, the groups can be entered into the transport system 12 in the following order: first, the group A, secondly, the group B and thirdly, the group C. The groups A, B and C therefore move around the loop Pa with the group A in front with respect to the direction of advance, and the group C at the rear with respect to this direction of advance. The electronic unit 7 can activate a device 34 to send the group of objects C to a transport module 20, 22, while the groups A and B continue to circulate around the loop Pa. Then, the electronic unit 7 activates the same device 34 to send the group of objects B to the destination transport module 20, 22 that already contains the group C, while the group A continues to circulate around the loop. Finally, the group A is also sent to the destination transport module 20, 22 within which the objects are located in a different sequence, in particular opposite, (C-B-A) from the sequence (A-B-C) of the source transport module 5. The device 1, by virtue of the loop structure described above, therefore performs the important function of modifying the relative positions of the sequentially ordered groups Ibs.

Furthermore, a device 34 can communicate with a transport portion 35 which has an exchange device 37 at one of its ends that communicates with the inlets 20i of two (or more) transport modules 20, 22. This variant is usually implemented when the transport modules 20, 22 are remote from the exchange device 34; in this way, a single transport portion (the portion 35) is used for connecting the modules 20, 22. Furthermore, if the exchange device 37 breaks down, the operation of the loop Pa is safe-guarded.

The embodiment described with reference to FIG. 7 can be considered as a simplification of the embodiment described in FIG. 1. In particular, the device la of FIG. 7 has the same structure as the device of FIG. 1, and differs only in terms of the transport system 12 which lacks the re-circulation zone 17. The parts that are the same as those described above are therefore not described again, and are indicated using the same reference numbers. In the example illustrated in FIG. 7, all of the transport modules 5 can communicate with their outlet 5*o* with a transport system 12 (controlled by the electronic unit 7) which includes:

- an intake zone 14 including a vertical transport portion 12*a* that communicates with all of the outlets 5*o* and receives the groups of partly superimposed postal objects output from any transport module 5;
- a transport zone 15 comprising a horizontal transport portion 12*b* that receives the postal objects from the transport portion 12*a*; and
- an outlet zone 16 comprising a vertical transport portion 12*c* that receives the postal objects from the transport portion 12*b* and communicates with the inlets 20*i* of all of the modules 20.

The transport device 12 forms an open U-shape path that enables the transport of the group Ibs from any source module 5 to any destination module 20, 22.

Figure 7:
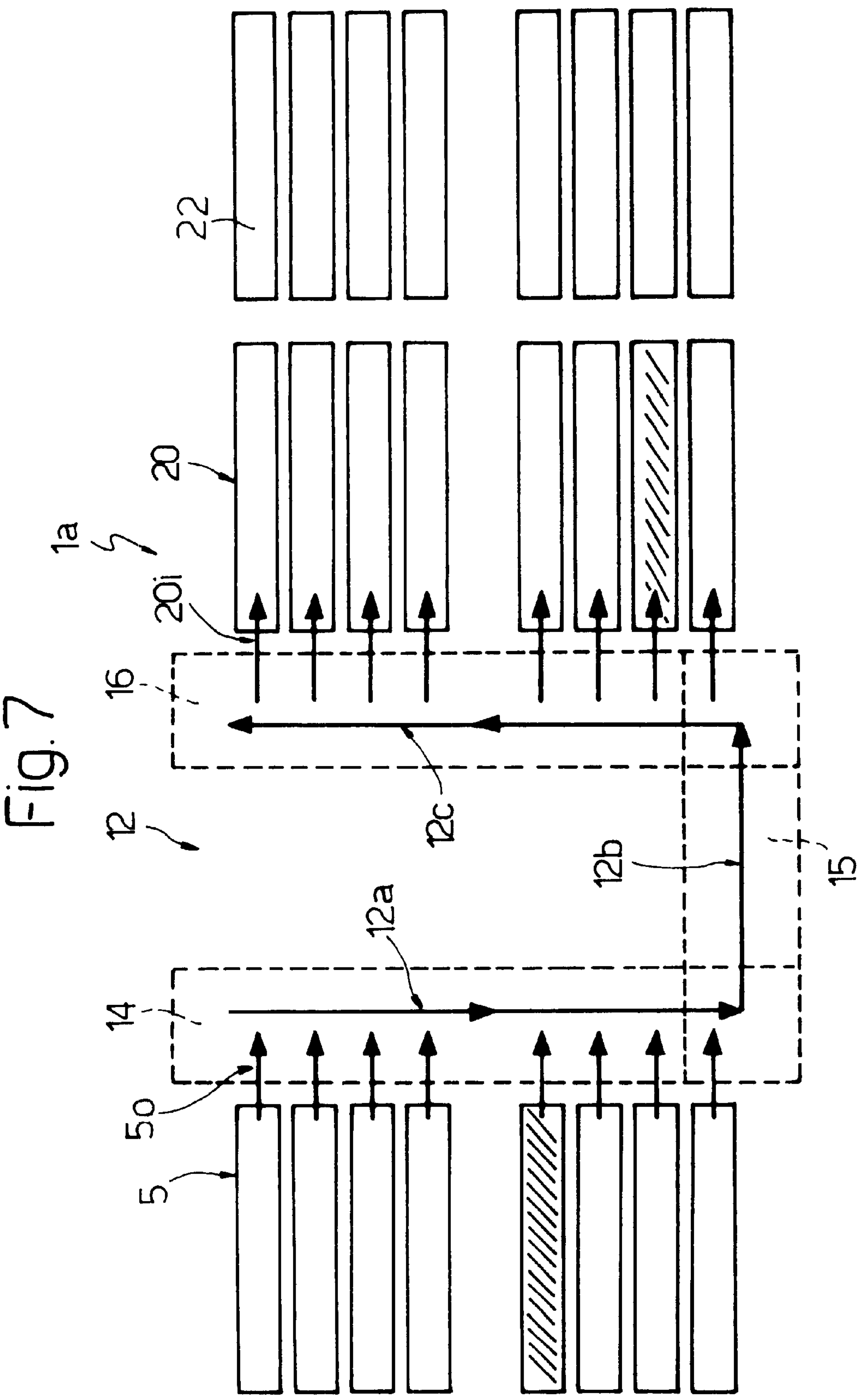
FIG. 7 illustrates a fifth variant of the device of FIG. 1.

In the embodiment of FIG. 7, the groups Ibs that enter the transport system 12 use the transport portion 12*a*, the transport portion 12*b* and the transport portion 12*c*. The number of groups Ibs that can be contemporaneously disposed on the U-shape path is directly proportional to the capacity (the length) of the U-shape path, the length of the groups Ibs and the distance there must be between consecutive groups Ibs.

Figure 3:
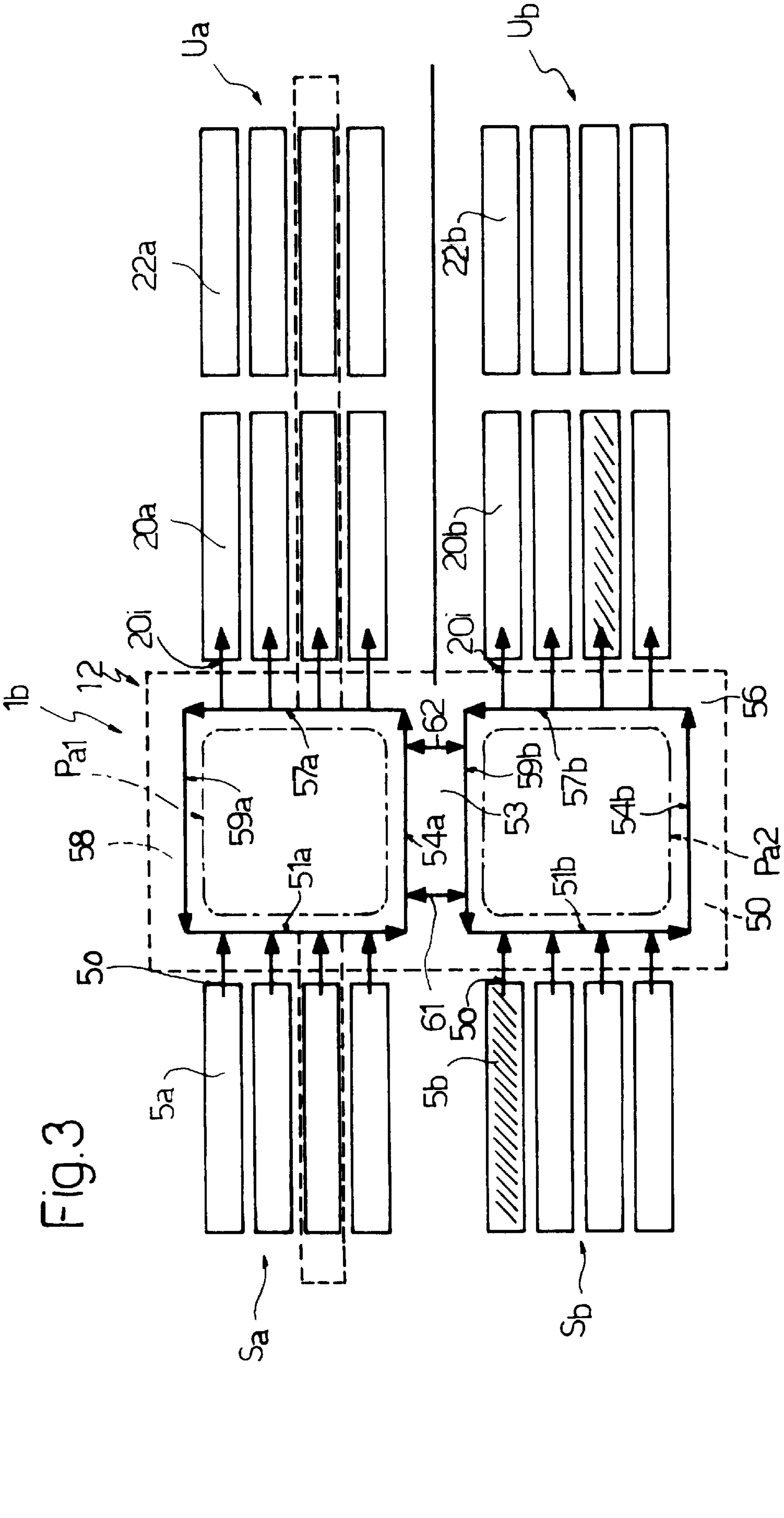
FIG. 3 illustrates a first variant of the device of FIG. 1.

The embodiment represented with reference to FIG. 3 can be considered as an elaboration on the embodiment described with reference to FIG. 1. In particular, the device 1*b* of FIG. 3 has the same structure as the device of FIG. 1, and differs only in that the transport system 12 defines two interconnected loops, Pal and Pa2. The parts that are the same as those described above are therefore not further described, and are indicated using the same reference numerals. Parts having similar structures or functions are indicated using the same reference numerals to which a subscript has been added.

The device 1*b* includes a first plurality of first transport modules 5*a* belonging to a first input section Sa, and a second plurality of second modules 5*b* belonging to a second input section Sb of the device 1*b*. Similarly, the device 1*b* includes a first plurality of second transport modules 20*a*, 22*a* belonging to a first outlet section Ua, and a second plurality of second modules 20*b*, 22*b* belonging to a second outlet section Ub of the device 1*b*.

The loop transport system 12 (controlled by the electronic unit 7), includes:

- an intake zone 50 including a first vertical transport portion 51*a* that communicates with all of the outlets 5*o* of the section Sa and receives the groups of partly superimposed postal objects Ibs output from any transport module 5*a;*
- a transport zone 53 including a horizontal transport portion 54*a* that receives the postal objects from the portion 51*a;*
- an outlet zone 56 including a vertical transport portion 57*a* that receives the postal objects from the transport portion 54*a* and communicates with the inlets 20*i* of all of the modules 20*a* of the first outlet section Ua; and
- a re-circulation zone 58 including a horizontal transport portion 59*a* that receives the postal objects from the transport portion 57*a*, and provides them as input to the transport portion 5*a.*

The loop transport system 12 also includes;

- a second vertical transport portion 51*b* that communicates with all of the outlets 50*o* of the second input section Sb and receives the groups of partly superimposed postal objects Ibs output from any transport module 5*b;*
- a horizontal transport portion 54*b* that receives the postal objects from the portion 51*b;*
- a vertical transport portion 57*b* that receives the postal objects from the transport portion 54*b* and communicates with the inlets 20*i* of all of the modules 20*b* of the second outlet section Ub; and
- a horizontal transport portion 59*b* that receives the postal objects from the transport portion 57*b* and supplies them as input to the transport portion 51*b.*

The transport device 12 forms a first loop Pa1 for the groups Ibs, comprising the portions 51*a*, 54*a*, 57*a*, 59*a*, and a second loop Pa2 for the groups Ibs, comprising the portions 51*b*, 54*b*, 57*b* and 59*b*; the said first and second loops Pa1 and Pa2 communicate via exchange portions 61, 62 extending between end portions of the portion 54*a* and 59*b* in order to enable the groups Ibs to pass from the first loop Pal to the second loop Pa2.

The exchange portions 61, 62 ensure:

- the exit of a group Ibs from the loop;
- the linear transport of the group Ibs; and
- the intake of the group Ibs into the other loop.

This interconnected multiple loop topology (the loops Pa1 and Pa2, the exchange portions 61, 62) enables the separate management of the intake, the transport and the output of the groups Ibs belonging the section Sa and Ua and, respectively Sb and Ub. The groups Ibs coming from a transport module 5*a* of the first input section Sa only have to pass through the loop Pa1 of the transport system 12 in order to reach a transport module 20*a*, 22*a* of the outlet section Ua, and the groups Ibs coming from the transport module 5*b* of the second input section Sb only have to pass through the loop Pa2 of the transport system 12 in order to arrive at a transport module 20*b*, 22*b* of the outlet section Ub. For the same transport speed, the transport times are reduced in that the loops Pa1 and Pa2 are shorter than a single loop Pa. The multiple loop structure enables an increase (a doubling in the example illustrated) in the sustainable capacity when the loops are used as independent transport loops.

The electronic unit 7, together with the transport system having several loops as described above, further enables the choice of loop (Pa1 or Pa2) to be utilised for the transfer of the group Ibs in such a way as to achieve the transport along the system 12 in the least time possible.

Furthermore, it is clear that the transport system 12 could generally include a plurality of loops (not shown) for transporting the groups Ibs that are connected to each other by exchange portions (not shown) in order to ensure the output of a group Ibs from a loop, the linear transport of the group Ibs and the admission of the group Ibs into another loop.

Figure 4:
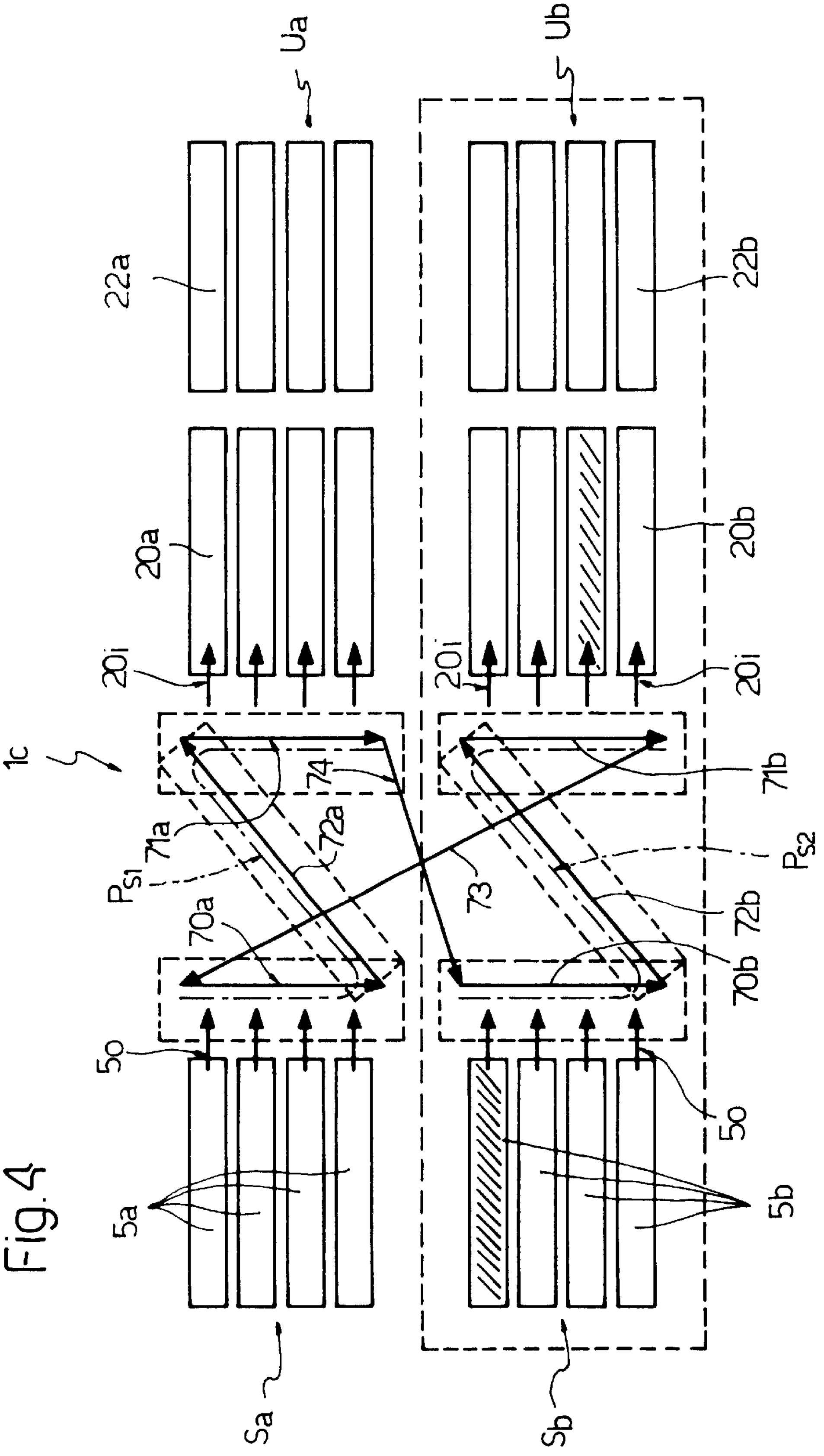
FIG. 4 illustrates a second variant of the device of FIG. 1.

With particular reference to FIG. 4, a device 1c is illustrated including a first plurality of first transport modules Sa belonging to a first input section Sa and a second plurality of second modules 5*b* belonging to a second input section Sb of the device 1c. Similarly, the device 1c includes a first plurality of second transport modules 20*a*, 22*a* belonging to a second outlet section Ua, and a second plurality of second modules 20*b*, 22*b* belonging to a second outlet section Ub of the device lb.

The loop transport system 12 (controlled by the electronic unit 7) includes:

- a first vertical input transport portion 70*a* that communicates with all of the outlets 5*o* of the section Sa, and receives the groups of partly superimposed postal objects Ibs output from any transport module 5*a;*
- a first vertical output transport portion 71*a* that communicates with the inlets 20*i* of all of the modules 20*a* of the first outlet section Ua;
- a first interconnection portion 72*a* that extends between an outlet of the portion 70*a* and an inlet of the portion 71*a*, and transports the groups Ibs from the modules 5*a* to the modules 20*a*, 22*a;*
- a second vertical input transport portion 70*b* that communicates with all of the outlets 5*o* of the section Sb and receives the groups of partly superimposed postal objects Ibs output from any transport module 5*b*—the portion 70*b* does not communicate directly with the portion 70*a;*
- a second vertical outlet transport portion 71*b* that communicates with the inlets 20*i* of all of the modules 20*b* of the second outlet section Ub;
- a second interconnection portion 72*b* that extends between an outlet of the portion 70*b* and an inlet of the portion 71*b*, and transports the groups Ibs from the modules 5*b* to the modules 20*b*, 22*b;*
- a first re-circulation portion 73 that extends between an outlet of the second outlet transport portion 71*b*, and an inlet of the first vertical input transport portion 70*a* for transferring the groups Ibs between the sections Sb and Sa; and
- a second recirculation portion 74 that extends between an outlet of the first vertical output transport portion 71 and an inlet of the second vertical input transport portion 70*b* for transferring the groups Ibs between the sections Sa and Sb.

The topology of the transport device 12 described above, the so-called "crossed loop", includes an upper open half-loop Ps1 formed from the portions 70*a* , 72*a* and 71*a*, and a lower open half- loop Ps2 formed from the portions 70*b*, 72*b* and 71*b*; the said half- loops Ps1 and Ps2 being interconnected by the re-circulation portions 73 and 74 that “cross” in their schematic representation on one plane. The “crossed loop” structure is usually of the non-planar type in which the re-circulation portions 73 and 74 have a superimposed zone in which the portions themselves are located on different planes in order not to interfere with each other. Obviously, the half- loops Ps1 and Ps2 could also be located on different planes.

This topology enables the groups Ibs to be transported by the system 12 utilising the half- loop Ps1 or Ps2 separately in such a way that two different groups Ibs coming from respective sections Sa and Sb do not, during their transport through the system 12, have to share any common portion of path. Where the transport of groups Ibs does not envisage any of the groups Ibs leaving the respective half- loops Ps1 and Ps2, this structure enables the multiplication (by two in the example illustrated) of the sustainable capacity of the transport system with respect to the sustainable capacity of a simpleloop system.

Figure 5:
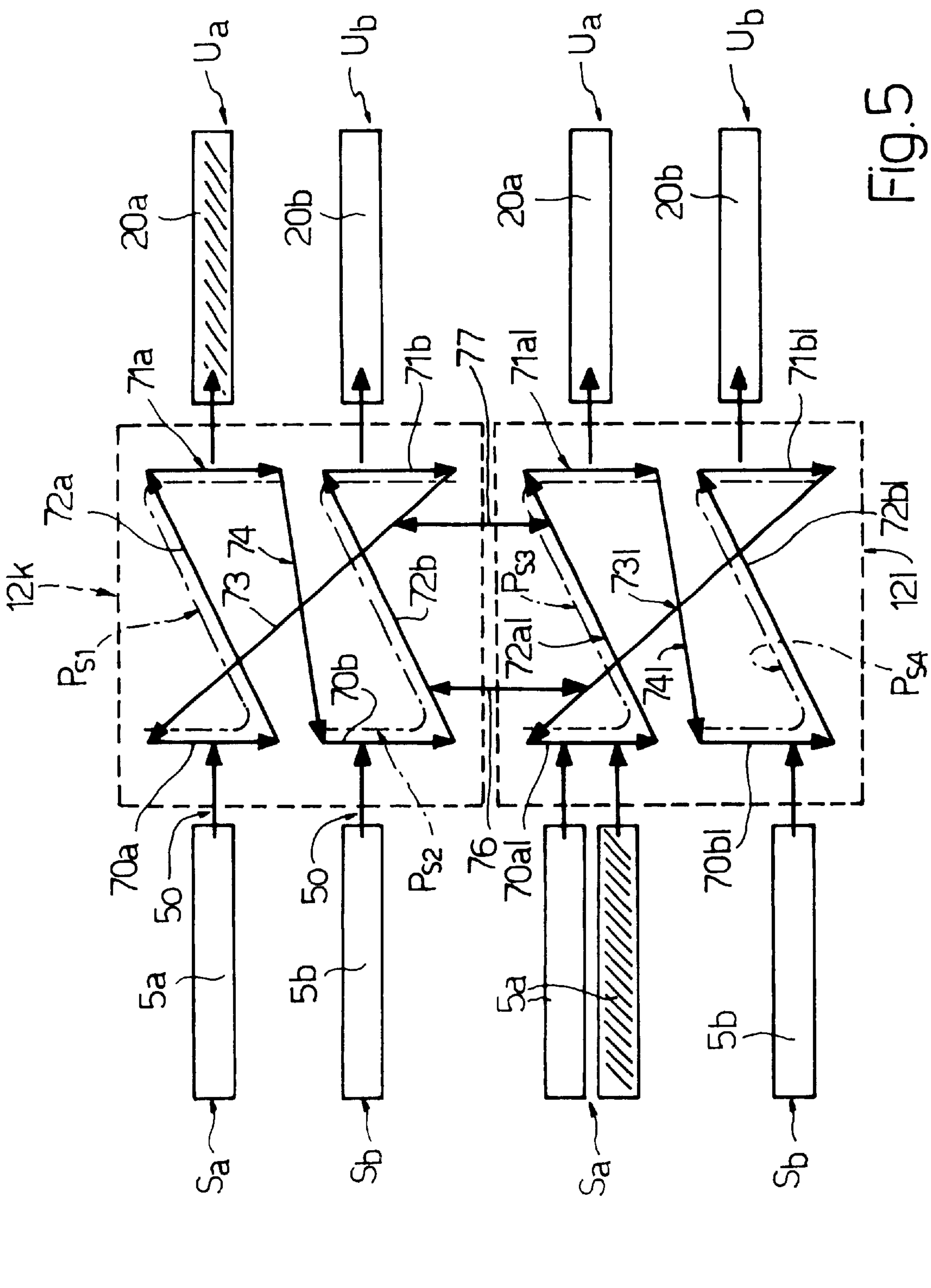
FIG. 5 illustrates a third variant of the device of FIG. 1.

The embodiment illustrated in FIG. 5 includes two transport systems 12*k* and 12*l*, each having a “crossed loop” structure, substantially the same as the structure of the transport system of FIG. 4. The “crossed loop” transport system 12*k* in fact includes an upper open half-loop Ps1 formed from the portions 70*a*, 72*a* and 71*a*, and a lower open half- loop Ps2 formed from the portions 70*b*, 72*b* and 71*b*; the said half-loops Ps1 and Ps2 being interconnected by re-circulation portions 73 and 74.

On the other hand, the “crossed loop” transport system 12*l* includes an upper open half- loop Ps3 formed from portions 70*al*, 72*al* and 71*al*, and a lower open half-loop Ps4 formed from portions 70*bl*, 72*bl* and 71*bl*; the said half- loops Ps3 and Ps4 being interconnected by re-circulation portions 73*l* and 74*l*.

Furthermore, interconnection and exchange portions 76, 77 are provided that extend respectively between the portions 72*b* and 73*l* and 73 and 72*al* in order to enable the groups Ibs to move between the first and second transport systems 12*k* and 12*l*.

The interconnection and exchange portions 76, 77 ensure:

the output of a group Ibs from a first “crossed loop” transport system;

the linear transport of the group Ibs; and the admission of the group Ibs into the other “crossed loop” transport system.

The structure of the transport system 12 described above enables the separate management of the intake, the transport and the output of the groups Ibs that enter the transport systems 12*l* and 12*k*. It is clear that each “crossed loop” transport system can include more than two half- loops coupled to each other, and that more than two “crossed loop” transport systems can be interconnected.

Figure 6:
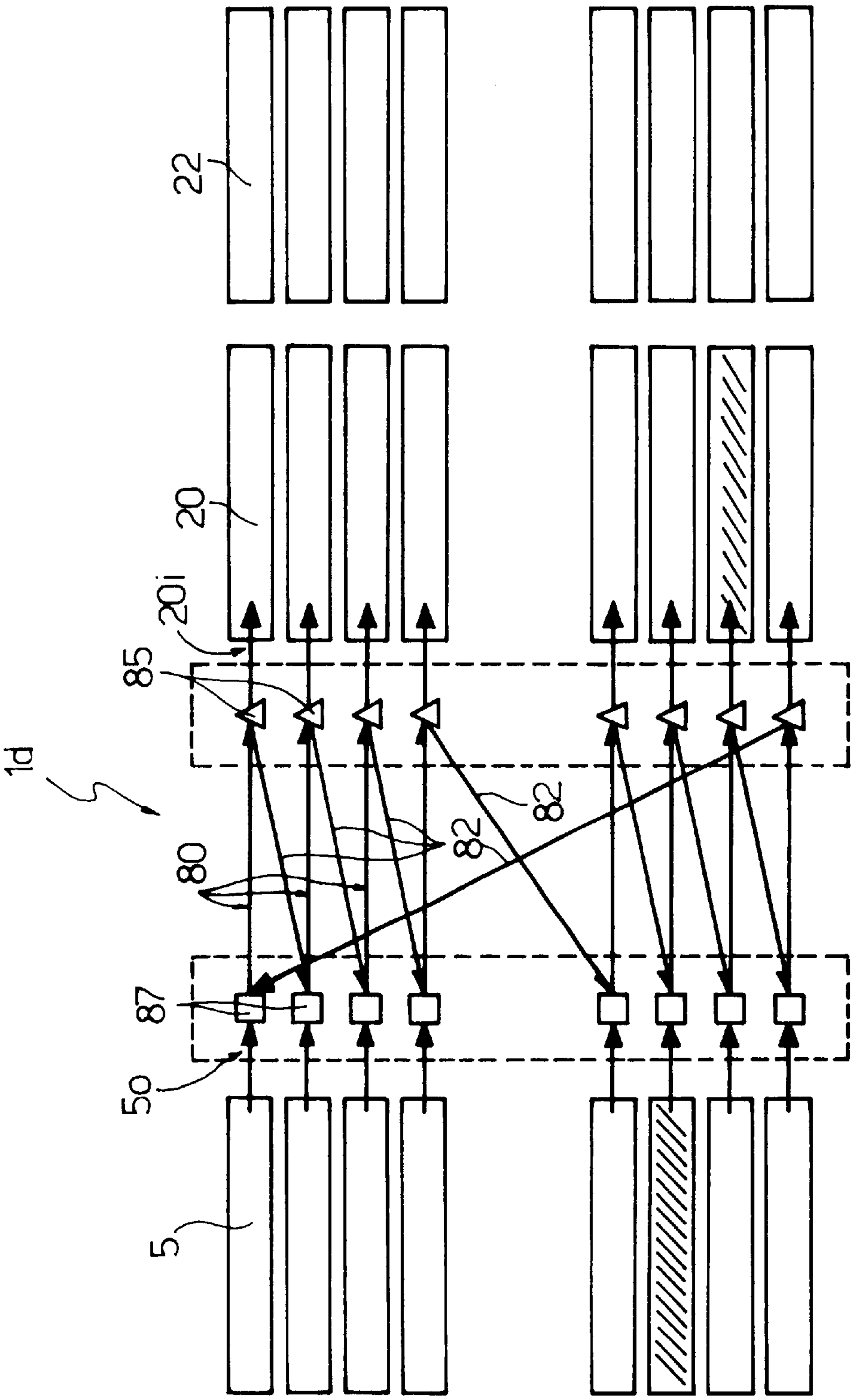
FIG. 6 illustrates a fourth variant of the device of FIG. 1.

FIG. 6 illustrates a device 1d in which the transport system 12 includes:

a plurality of direct transport portions 80 that directly interconnect an outlet 5*o* of a first transport module 5 with a respective inlet 20*i* of a second transport module 20; each direct transport portion 80 extends from a first end thereof associated with the outlet 5*o* of the first transport module 5 and a second end associated with the inlet 20*i* of a second transport module in order to achieve the direct transport of a group Ibs from a transport module 5 towards a transport module 20; and a plurality of guide portions 82 that extend from a second end of a direct transport portion 80 to a first end of a different direct transport portion 80.

The principle control elements (controlled by the electronic unit 7) of the device 1d are as follows:

an exchange device 85 (indicated with a triangle) located at a second end of the direct transport portion 80 and having two positions: a first position in which the second end of the portion 80 is in communication with an inlet 20*i* of the transport modules 20, 22, the communication of the second end of the direct transport portion 80 with the guide portion 82 being at the same time prevented; and a second position in which the second end of the direct transport portion 80 is in communication with the guide portion 82, preventing the second end of the tract 80 communicating with the inlet 20*i* of the module 20, 22; and an intake device 87 (indicated with a square) that connects an end of the guide portion 82 with the first end of a direct transport portion 80.

A group Ibs that leaves a first module 5 is sent towards the inlet 20*i* of a respective second module 20 through the direct transport portion 80; when this group Ibs reaches the second end of the direct transport portion 80, two different situations can arise;

the exchange device 85 is located in the first position and the group Ibs enters the second module 20 on the path 20*p;* the exchange device 85 is in the second position, and the group Ibs does not enter the second module 20, but instead continues along the guide portion 82 towards a first module 5 and, when it reaches the end of the guide portion 82, locates on the first end of a direct transport portion 80 by virtue of the intake device 87. The group Ibs is then sent to the inlet 20*i* of a further second module 20 and the operations indicated above are repeated.

The direct transport portion 80 alternated by the guide portions 82 form a closed, spiral path that enables the groups Ibs to utilise separately different portions of the path; groups Ibs coming from different transport modules 5 and forwarded directly (that is, using a single direct transport portion 80) to respective modules 20, 22 do not have to share any portion of the spiral path during their transport. In the case of postal streams that do not envisage any section change, the transport device 12 described above enables the multiplication (with respect to the capacity sustained with a simple-loop path) of the sustainable capacity by a factor equal to the number n of direct transport portions 80 present in the transport system 12.

Figure 8:
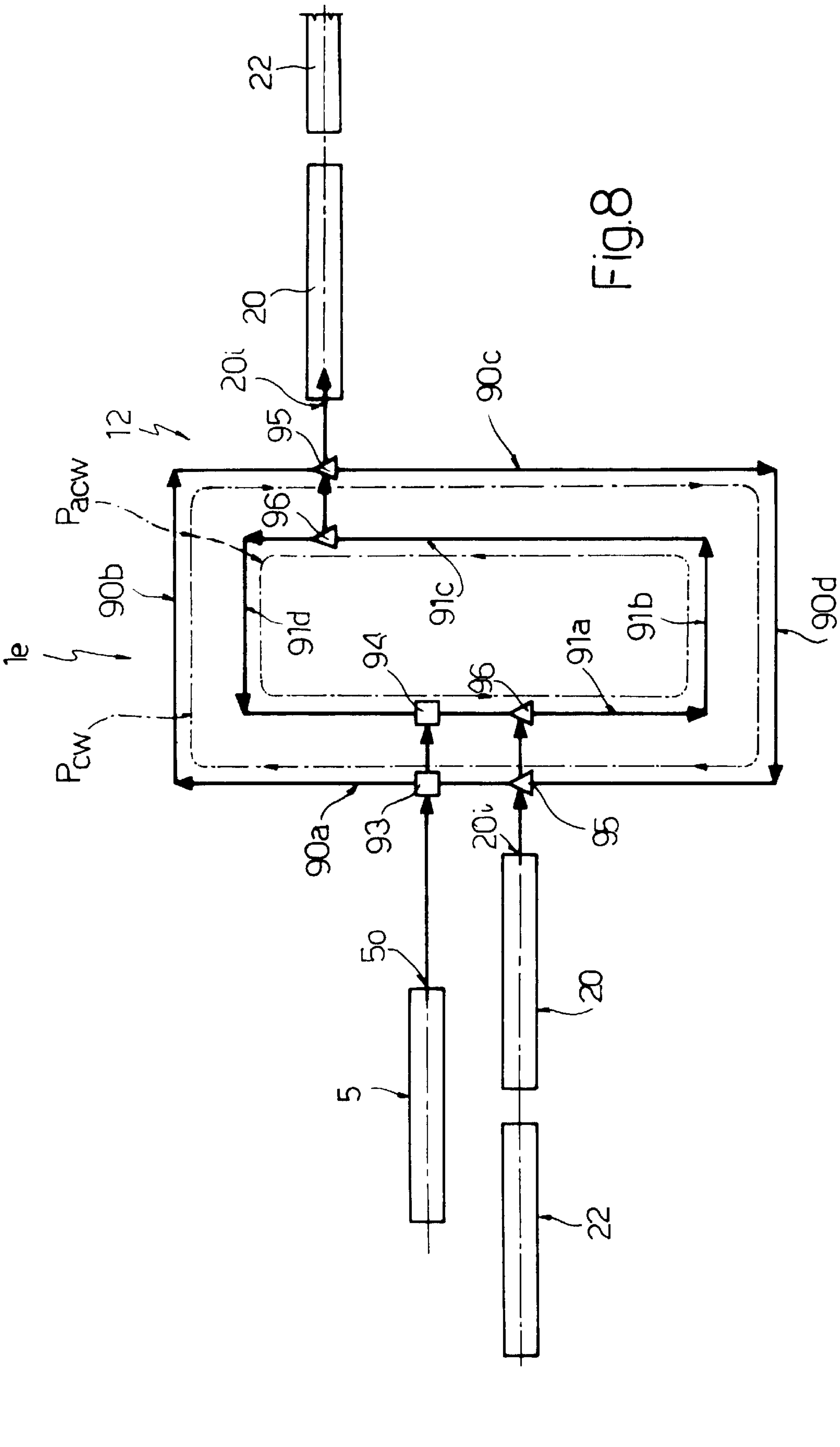
FIG. 8 illustrates a sixth variant of the device of FIG. 1.

FIG. 8 illustrates an embodiment in which a device 1e includes aloop transport system 12 controlled by the electronic unit 7 and including:

a vertical transport portion 90*a,* an upper horizontal transport portion 90*b* that receives as input the postal objects from the portion 90*a;* a vertical transport portion 90*c* that receives as input the postal objects from the portion 90*b*; and a lower horizontal transport portion 90*d* that receives as input the postal objects from the portion 90*c*, and provides them to the portion 90*a*.

The portions 90*a*, 90*b*, 90*c* and 90*d* together define a closed- loop path Pcw along which the groups Ibs move in a clockwise direction.

The transport system 12 further includes:

a vertical transport portion 91*a* that is parallel and close to the portion 90*a;* a lower horizontal transport portion 91*b* that receives as input the postal objects from the portion 90*a* and which is parallel and close to the portion 90*d;* a vertical transport portion 91*c* that receives as input the postal objects from the portion 91*b* and which is parallel and close to the portion 90*c*; and an upper horizontal transport portion 91*d* that receives as input the postal objects from the portion 91*c* and supplies them to the portion 91*a*—the portion 91*d* being parallel and close to the portion 90*b*.

The portions 91*a*, 91*b*, 91*c* and 91*d* together define a closed- loop path Pacw along which the groups Ibs move in an anticlockwise direction. In addition, the loop Pacw is located within the loop Pcw.

Each module 5 has an outlet 5*o* that communicates with both loops Pcw and Pacw by means of respective insertion devices 93, 94 that supply a group Ibs leaving the module 5 to the loop Pcw or the loop Pacw.

The electronic unit 7 controls both the insertion devices 93, 94 for the insertion of the group Ibs on one of the two loops Pcw and Pacw.

Similarly, each module 20, 22 has an inlet 20*i* that communicates with both loops Pcw and Pacw by means of respective exchange devices 95, 96 that supply a group Ibs leaving the loop Pcw or the loop path Pacw, respectively, to an inlet 20*i*. The electronic unit 7 controls both the exchange devices 95, 96 for the output of a group Ibs circulating on a respective loop Pcw or Pacw. As can be seen in FIG. 8, the device le has a "distributed" structure according to which the outlets 5*o* of the first transport modules 5 alternate along the paths Pcw and Pacw of the transport system 12 with inlets 20*i* to second transport modules 20, 22.

The device le with double counter-rotating loops has a multiplicity of advantages, including:

- the connection between all of the modules 5 and the modules 22 is ensured even if one of the two loops pcw and pacw is not functioning;
- it is possible to choose the loop that ensures the transport in the least possible time;
- a considerable increase in the sustainable capacity is obtained, for example, a doubling in capacity where there are two loops.

What is claimed is:

1. An accumulation and transport device for groups of partly superimposed postal objects, characterised in that it includes:

- a plurality of first transport modules (5), each defining a first transport path (5*p*) extending from an inlet (5*i*) to an outlet (5*o*) of the said transport module (5); the said first transport module (5) being able to move a group of partly superimposed postal objects (Ibs) along the said first transport path (5*p*), aligned along a transport direction and having spaced front edges (S); the said first transport modules (5) receiving as input groups of partly superimposed postal objects (Ibs);
- a plurality of second transport modules (20, 22), each defining a second transport path (20*p*, 22*p*) extending from an inlet (20*i*) to an outlet (22*o*) of the said second transport module (20, 22); each second transport module (20, 22) being able to move a group of partly superimposed postal objects (Ibs) along the said second transport path (20*p*, 22*p*); and
- a transport hoop system (12) interposed between all the outlets (5*o*) of the first transport modules (5) and all the inlets (20*i*) of the second transport modules (20); the said transport hoop system (12) being coupled with control means (32, 40, 30, 7, 34) for receiving a said group of partly superimposed postal objects arriving from any outlet (5*o*) of a said first transport module (5) and supplying the said group of partly superimposed postal objects (Ibs) to any inlet (20*a*) of the said second transport module (20, 22).

2. A device according to claim 1, characterised in that the said transport hoop system (12) defines at least a first loop (Pa) for the transit of the said groups of partly superimposed postal objects (Ibs), that communicates with outlets (5*o*) of a first sub set (Sa) of the said first transport module (5*a*), and with inlets (20*i*) of a first sub set (Sa) of the said second transport modules (20*a*, 22*a*);

- the said transport system further defining at least a second loop (Pb) for the transit of the said groups of partly superimposed postal objects (Ibs) in communication with outlets (5*o*) of a second sub set (Sb) of the said first transport modules (5*b*), and with inlets (20*i*) of a second sub set (Sb) of the said second transport modules (20*b*, 22*b*); interconnection means (61, 62) being provided between the said first and second loops (Pa, Pb) to enable the exchange of the said groups of partly superimposed postal objects (Ibs) between the said loops (Pal, Pbl).

3. A device according to claim 1, characterised in that the said transport hoop system (12) defines at least a first closed loop (Pcw) for the transit of the said groups of partly superimposed postal objects (Ibs), and a second closed loop (Pacw) for the transit of the said groups of partly superimposed postal objects (Ibs);

- each first transport module (5) being able to communicate in output (5*o*, 93, 94) with the said first loop (Pcw) and with the said second loop (Pacw) to supply a group of partly superimposed postal objects to the said first loop (Pcw) or the second loop (Pacw);
- each second transport module (20, 22) having an inlet (20*i*) that communicates (95,96) with the said first loop (Pcw) and the said second loop (Pacw) in order to receive a group of partly superimposed postal objects from the said loop (Pcw) or the said second loop (Pacw).

4. A device according to claim 3, characterised in that the said transport hoop system (12) exhibits a direction of rotation on the first closed loop part (Pacw) opposite to the direction of rotation on the first closed loop part (Pacw).

5. A device according to claim 1, characterised in that the said outlets (5*o*) of the said first transport modules (5) alternate along a path formed from the said transport hoop system (12) with inlets (20*i*) of the said second transport modules (20, 22).

* * * * *